United States Patent [19]

Laska et al.

[11] 4,260,244

[45] Apr. 7, 1981

[54] PHOTOGRAPHIC REPRINT SYSTEM WITH FILM SIZE CODE COMPARISON

[75] Inventors: Ronald C. Laska, Minnetonka; Janis Pone, Minneapolis, both of Minn.

[73] Assignee: Pako Corporation, Minneapolis, Minn.

[21] Appl. No.: 109,824

[22] Filed: Jan. 7, 1980

Related U.S. Application Data

[63] Continuation-in-part of Ser. No. 23,521, Mar. 23, 1979, abandoned.

[51] Int. Cl.³ ..................... G03B 27/72; G03B 27/76
[52] U.S. Cl. ....................................... 355/35; 355/77; 355/88
[58] Field of Search ................... 355/6, 14 C, 14 CU, 355/14 R, 18, 32, 35, 38, 40, 41, 45, 50, 51, 55, 64, 77, 97, 88; 250/548, 566, 571

[56] References Cited

U.S. PATENT DOCUMENTS

| | | | |
|---|---|---|---|
| 3,447,871 | 6/1969 | Neale | 355/18 |
| 3,873,201 | 3/1975 | Amano | 355/38 |
| 3,888,580 | 6/1975 | Amano et al. | 355/38 |
| 3,947,110 | 3/1976 | Yamada | 355/38 |
| 4,065,661 | 12/1977 | Jaskowsky | 355/6 X |
| 4,128,330 | 12/1978 | Fergg et al. | 355/32 |
| 4,150,894 | 4/1979 | Meyer et al. | 355/38 |

*Primary Examiner*—Richard A. Wintercorn
*Attorney, Agent, or Firm*—Kinney, Lange, Braddock, Westman and Fairbairn

[57] ABSTRACT

A photographic reprint system utilizes an elongated paper tab to which film segments or strips are attached. Information relating to the printing of each film frame of the segments attached to the tab is stored sequentially in a storage medium such as a floppy disk. This information includes the selected color balance setup and a film size or format code indicating the size of the film segment. After the tab with attached film segments has been prepared, it is taken to a photographic printer, where the tab with the attached film segments is advanced sequentially and the negatives are printed. The printing is based upon information which is sequentially retrieved from the storage medium. Among the information contained in the selected color balance setup is a film size code indicating the size of film for which the color balance setup is used. The photographic printer compares the film size code from the selected color balance setup with the film size code retrieved from the storage medium. If the two film size codes do not correspond, this indicates an error condition, and operation of the printer is halted or other action consistent with automatic printer operation is taken.

10 Claims, 6 Drawing Figures

PHOTOGRAPHIC REPRINT SYSTEM WITH FILM SIZE CODE COMPARISON

REFERENCE TO CO-PENDING APPLICATIONS

The present application is a continuation-in-part of U.S. Patent application Ser. No. 023,521 filed Mar. 23, 1979 by Ronald B. Harvey, Janis Pone, Ronald C. Laska and Francis M. Laciak now abandoned, which is assigned to the same assignee as the present application.

Reference is also made to the following U.S. patent applications, all of which are assigned to the same assignee as the present application, are filed on even date with this application, and are continuations-in-part of the above-mentioned application Ser. No. 023,521: Ser. No. 109,823, entitled "Photographic Reprint System With Dual Indicia Sensor for Synchronization Recovery"; Ser. No. 109,822, entitled "Photographic Reprint System with Reprint Neghold Indication"; Ser. No. 109,821, entitled "Photographic Reprint System with Large Print Quantity Verification"; and Ser. No. 109,825, entitled "Photographic Reprint System with Information Display".

BACKGROUND OF THE INVENTION

1. Field of the Invention

The present invention relates to photographic printing systems. In particular, the present invention is a photographic printing system in which negatives of different film types may be printed, while assuring that each utilizes proper color balance, magnification, paper feed lenth, etc.

2. Description of Prior Art

In commercial photographic processing operations, very high rates of processing must be achieved and maintained in order to operate profitably. In order to permit efficient automatic processing, orders containing films of similar type and size are typically spliced together for developing. As many as 500 to 1,000 rolls of twelve, twenty, twenty-four, and thirty-six exposure film of the same type and size may be spliced together for processing and printing purposes.

After developing, the photographic images contained in the film originals (generally negatives) are printed in an edge-to-edge relationship on a continuous strip of photosensitive paper by a photographic printer. The photographic printer causes high intensity light to be passed through the negative and imaged on the photographic print paper to expose the photographic emulsion layers of the paper. The print paper is subsequently processed to produce a print of the image contained in the negative.

This type of large-scale production is well suited to original or first-run production of photographic prints in which the film may be spliced to form a continuous roll. In the past, however, it has not been particularly well suited to production of reprints, where the customer has already received prints and has decided that he wishes to have additional prints made of certain negatives. Unlike first-run production, making of reprints has typically not been highly automated.

There are several reasons why reprints require special, less efficient handling. First, when reprints are ordered, the negatives generally have already been cut into short segments of three or four frames each, which are more difficult to handle than the longer film strips encountered in first-run production printing. Second, the customer may only desire reprints from one frame of a particular segment. This is unlike first-run production, in which a print is typically made from every printable negative on the strip. Third, often multiple prints rather than just a single print are desired from one or more negatives on a segment. Fourth, no extra nonprinting area on the film is normally available to which a splice may be made. Fifth, reprints are requested from a much wider variety of film types than are typically encountered in first-run production. This is because most first-run production involves recently purchased and exposed film, while reprints may be from films which were purchased many months or even years earlier.

Because of these problems, making of reprints has often been handled on a manual or semi-automatic basis, and often on a different printer from the high speed first-run production printers and on which it may be impossible to reproduce identical print color balance and density corrections. As a result, the quality of reprints often differs from first-run production prints. The lower quality of reprints in comparison to first-run production prints is a source of customer dissatisfaction.

In order to overcome some of the problems of making reprints, and to provide more efficient automated printing of reprints, systems have been developed in which the individual segments of negatives from which reprints are to be made are temporarily attached to a long paper strip or "tab". The "tabbing" of negatives to be reprinted is performed at an "order entry" or "preparation" station, where indicia (typically in the form of punched holes) are formed in the tab adjacent the frames of the negatives. These holes are used as frame location indicators and also provide frame status information. For example, in one system the number of holes may vary from one to four, with the first hole always indicating the frame location, while multiple holes provide the frame status information to allow the printer system to maintain synchronization of reprint data with the tabbed film material. In this system, two holes at a frame signify the end of a film strip, three holes at a frame signify the end of a customer order, and four holes at a frame indicate the end of a reel. In this type of system, a data entry device and a data storage device at the preparation station are used by the operator to store for each frame the number of holes in the tab which should be sensed for each frame, print quantity, density/color corrections and setup number.

In a typical automated reprint system, a photographic printer includes sensors for sensing the indicia on the paper tab in order to sense the location of each frame to be printed. The data stored in the memory device for that particular frame is transferred to the photographic printer, and the required number of reprints, if any, from that frame are then produced.

While a reprint system of this type permits much higher productivity and permits the prints to be made on the same or similar printer to the one used for first-run production, there are still disadvantages. One of the disadvantages of the automated reprint system is that it normally requires sorting of the film not only by film size, but also by film type. This, of course, is also generally a disadvantage in first-run production printing.

In order to avoid sorting, some systems attach all films of the same size, even though different type, on the same paper tab and use the same color balance for all films. In this case, some of the reprints are of less than desired quality because the different film types on a single tabe require different exposures in order to produce the same quality prints.

In the previously mentioned co-pending application Ser. No. 23,521 of which this application is a continuation-in-part, color balance setups are automatically changed so that films of the same size but different film type may be attached together and printed in sequence automatically without requiring a sacrifice in print quality of saome of the prints due to differences in film types. In this system, an indication of the color balance setup to be used with each frame is stored when the film segments or strips are attached to the paper tab. Prior to printing a negative, the printer retrieves the stored information for that negative, including the color balance setup to be used. The printer then uses the designated color balance setup in printing that negative.

SUMMARY OF THE INVENTION

The present invention is an improved photographic reprint system which eliminates a potential source of errors which could result in improper reprinting of negatives and a loss of production time. In a system in which color balance setups can be changed during operation to accommodate different film types, errors can occur if the operator who originally selected the color balance setup has entered an incorrect color balance setup which is for a different film size than the film to be printed. Errors can also arise if the information being sequentially retrieved from a storage medium falls out of synchronization with the film strips being advanced and printed.

The present invention automatically checks for these types of errors. The photographic printing system of the present invention includes first storage means for storing a plurality of color balance setups. Each color balance setup includes a first film size code indicative of the film size with which the color balance setup is to be used. Second storage means store, for each film to be printed, an indication of a selected one of the plurality of color balance setups to be used in printing that film. In addition, a second film size code indicative of the size of the film is also stored.

Printing is based upon the information which is sequentially retrieved from the second storage means prior to printing the film. The present invention includes means for comparing the first and second film size codes prior to printing the film. If the first and second film size codes do not match, printing is inhibited, or other appropriate automatic action is taken which will permit the printer to continue operation without operator intervention.

DETAILED DESCRIPTION OF THE PREFERRED EMBODIMENTS

Figure 1:
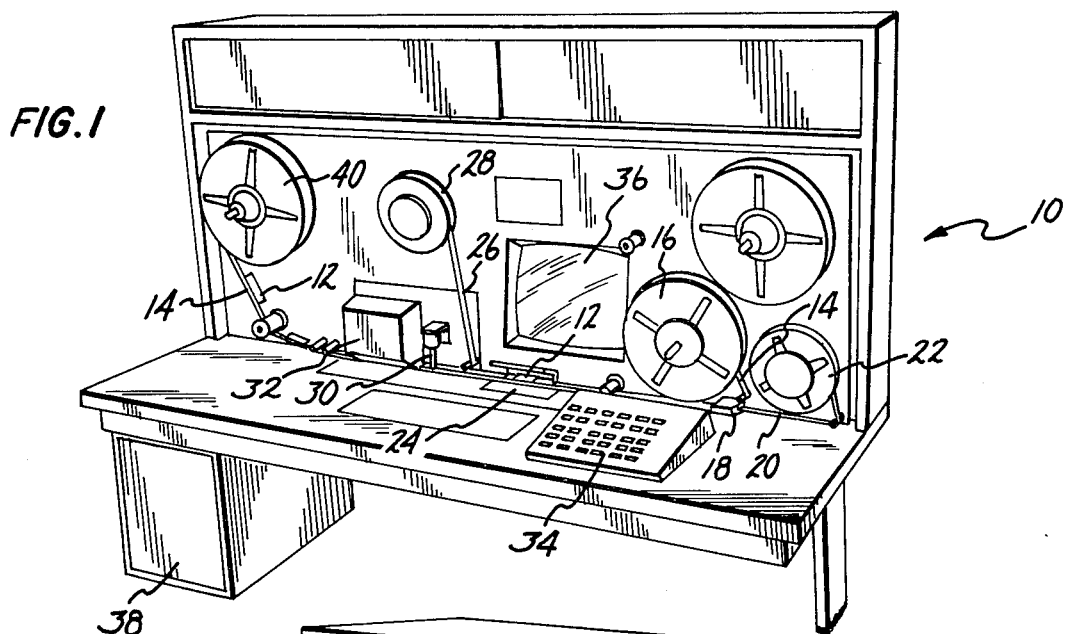
FIG. 1 is a perspective view showing a reprint film preparation station, at which strips of films are attached to a paper tab, and at which data is stored relating to each frame, including the color balance setup to be used in printing.

FIG. 1 shows reprint film preparation station 10, at which segments of strips of photographic film 12 are attached to a paper strip or tab 14. As shown in FIG. 1, paper tab 14 is fed from reel 16 under roller 18, where first transparent adhesive tape 20 is attached to the underside of tab 16. First tape 20 is supplied from reel 22, as shown in FIG. 1. The one edge of first tape 20 is exposed, and is used for attaching film segments 12 to paper tab 14 at mounting station 24. After film segments 12 are attached at mounting station 24, second transparent adhesive tape strip 26, which is fed from reel 28, is applied to the top surface of the junction between film segment 12 and paper tab 14. The use of first and second transparent tape strips 20 and 26 at top and bottom provides a more secure fastening of film segment 12 to paper tab 14.

After film segment 12 has been attached to paper tab 14, it advances to a marking station, at which punch holes are produced by paper punch 30. These holes are punched in paper tab 14 and indicate both the frame location and frame information. A single hole punched in paper tab 14 indicates the location of a frame. Two holes at a frame signify both frame location and the end of a film segment. Three holes indicate a frame location, the end of a film segment, and the end of an order. Four holes indicate the location of a frame, the end of a film segment, the end of an order, and the end of the reel. Paper tab 14 and film segment 12 then advance to a paper printer 32, which prints human readable information on paper tab 14 adjacent the strip of a particular frame.

Control of the operation of paper punch 30 and paper printer 32 is provided through data entry console 34. The operator of the preparation station enters, through console 34, information which is needed in the printing of prints from each frame. This information includes the end of strip, order, or reel information which determines the number of holes which should be sensed in tab 14 adjacent the frame, print quality for that frame, and density/color correction for that frame. The information entered through console 34 is displayed on data display 36 and is stored on a memory medium, such as a floppy disk, in controller/disk drive 38.

In the present invention, additional information is stored for each frame. This additional information is the setup number to be used in printing reprints from that particular frame and a film size code indicating the size of the film. The operator of the preparation station enters the color balance setup number and film siz code through console 34. Selection of the particular color balance setup number is determined by the particular film type, since different film types require different color balance parameters in order to produce acceptable quality prints.

With the present invention, it is no longer necessary to sort film segments 12 into different film types, which will be printed separately. Instead, film segments 12 representing a variety of different film types of the same film size may be attached to the same tab 14 for printing.

The present invention eliminates the need to compromise print quality significantly in order to avoid sorting by film type. As will be described later, the printer of the present invention automatically selects the proper color balance for each frame to be printed based upon the color balance setup number stored in the floppy disk for that particular film frame or strip.

As shown in FIG. 1, tab 14 with attached film segments 12 is wound onto take-up reel 40. Prior to printing, tab 14 and segments 12 may be transferred to a supply reel of a printer, or in other cases remain on take-up reel 40, which acts as the supply reel of the printer.

Figure 2:
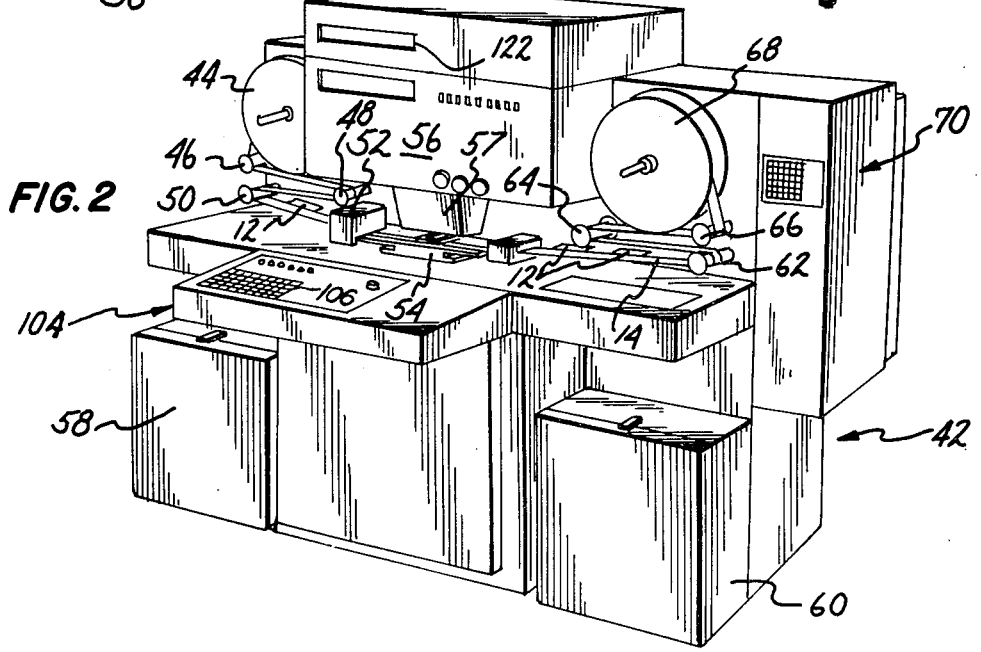
FIG. 2 is a perspective view of a photographic printer of the present invention used in producing photographic reprints.

FIG. 2 shows a photographic printer 42 which utilizes the present invention in producing reprints. In the printer 42 of FIG. 2, film segments 12 and paper tab 14 are supplied from supply reel 44 over stationary roller 46, bale arm 48, and stationary roller 50 to a film cleaning station 52, where the film segments 12 are cleaned prior to printing. Film segments 12 and paper tab 14 then advance to the neghold assembly 54, at which the frames are initially previewed by light sensors to determine whether automatic exposure corrections are necessary, and then are advanced to a print gate, where light from lamp house 56 and drop cone assembly 57 is passed downward through the negative to expose photosensitive print paper (not shown) located within printer 42. In FIG. 2, print paper is fed from a light-tight supply magazine 58, into printer 42 and onto a paper deck (not shown). After exposure, the print paper is fed out of printer 42 into light-tight takeup magazine 60. After the film segments 12 and paper tab 14 have passed the neghold station 54, they are advanced over stationary roller 62 and bale arm 64 and stationary roller 66 to takeup reel 68.

In the preferred embodiment of the present invention shown in FIG. 2, floppy disk drive/controller 70 is attached to printer 42. Floppy disk drive/controller 70 reads data from the floppy disk produced at preparation station 10 during the initial tabbing of the film.

Figure 3:
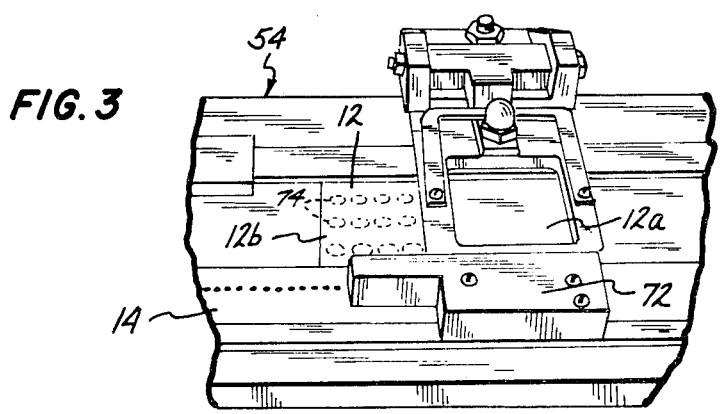
FIG. 3 is a view of a portion of the neghold assembly of the photographic printer of FIG. 2.

FIG. 3 shows a portion of neghold assembly 54 of printer 42. In FIG. 3, film segment 12 has a frame 12a located at the print gate and another frame 12b located at the preview gate of the neghold assembly. Frame 12a is in position for printing. Light is passed downward through frame 12a and onto the photosensitive paper (not shown) located within printer 42.

Positioned below frame 12b is an array of sensors 74 which measure density of frame 12b at a plurality of locations. These sensor measurements will be used in determining need for and the amount of automatic exposure corrections required when printing frame 12b.

FIG. 3 also shows a housing 72 containing light sources (such as lamps or light emitting diodes) which are used in the sensing of the holes in paper tab 14. Corresponding sensors (not shown in FIG. 3 but designated "102" in FIG. 4A) are positioned below paper tab 14, opposite the light sources. The sensors are located adjacent to both the preview gate and the print gate. The sensor adjacent the preview gate signals the printer to take array density readings and also is utilized to count the number of holes per frame. The sensor located adjacent the print gate signals the printer to stop the film feed because the frame is properly positioned at the print gate.

Figure 4A:
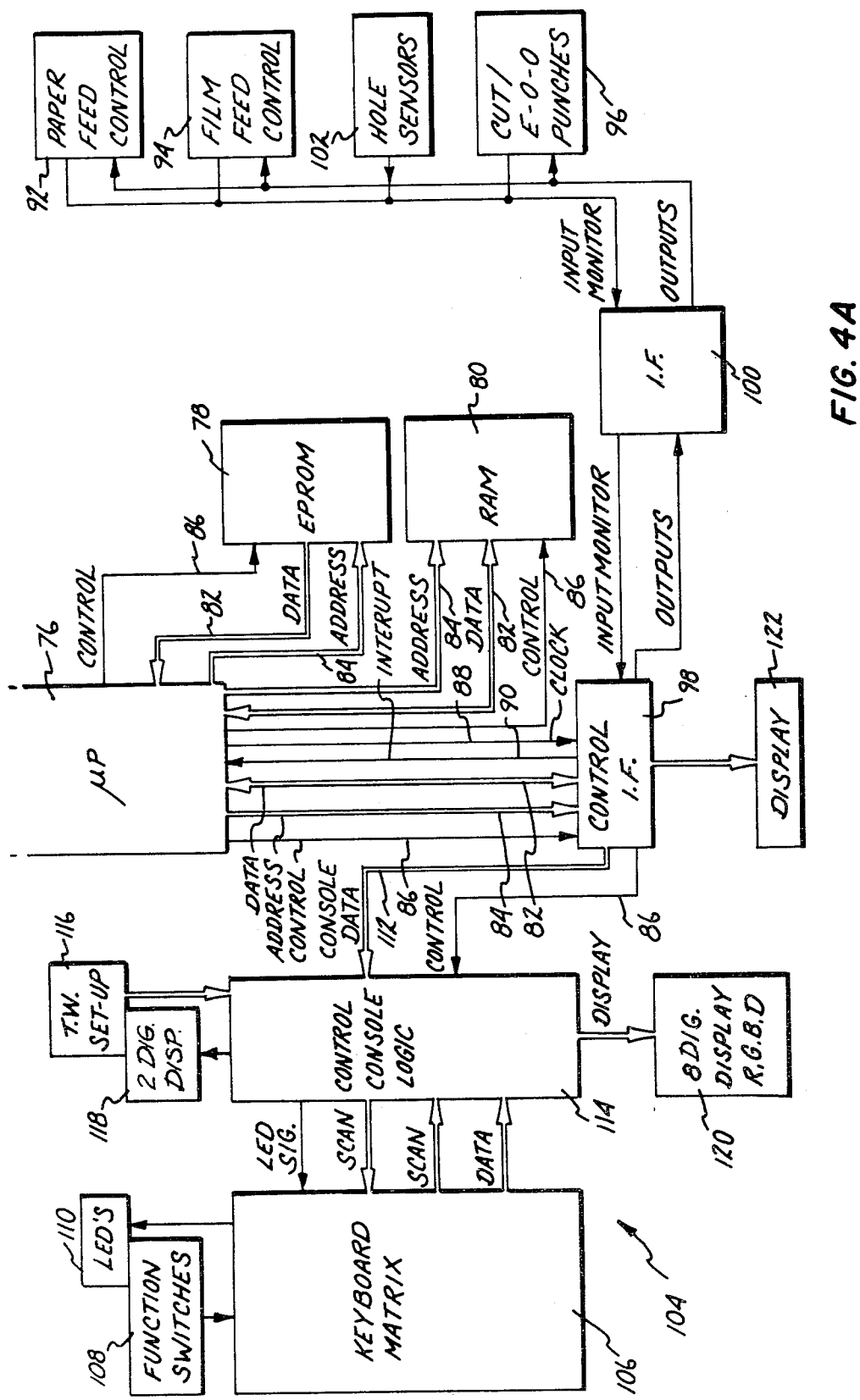
FIGS. 4A and 4B are an electrical block diagram of the photographic printer of FIG. 2.
Figure 4B:
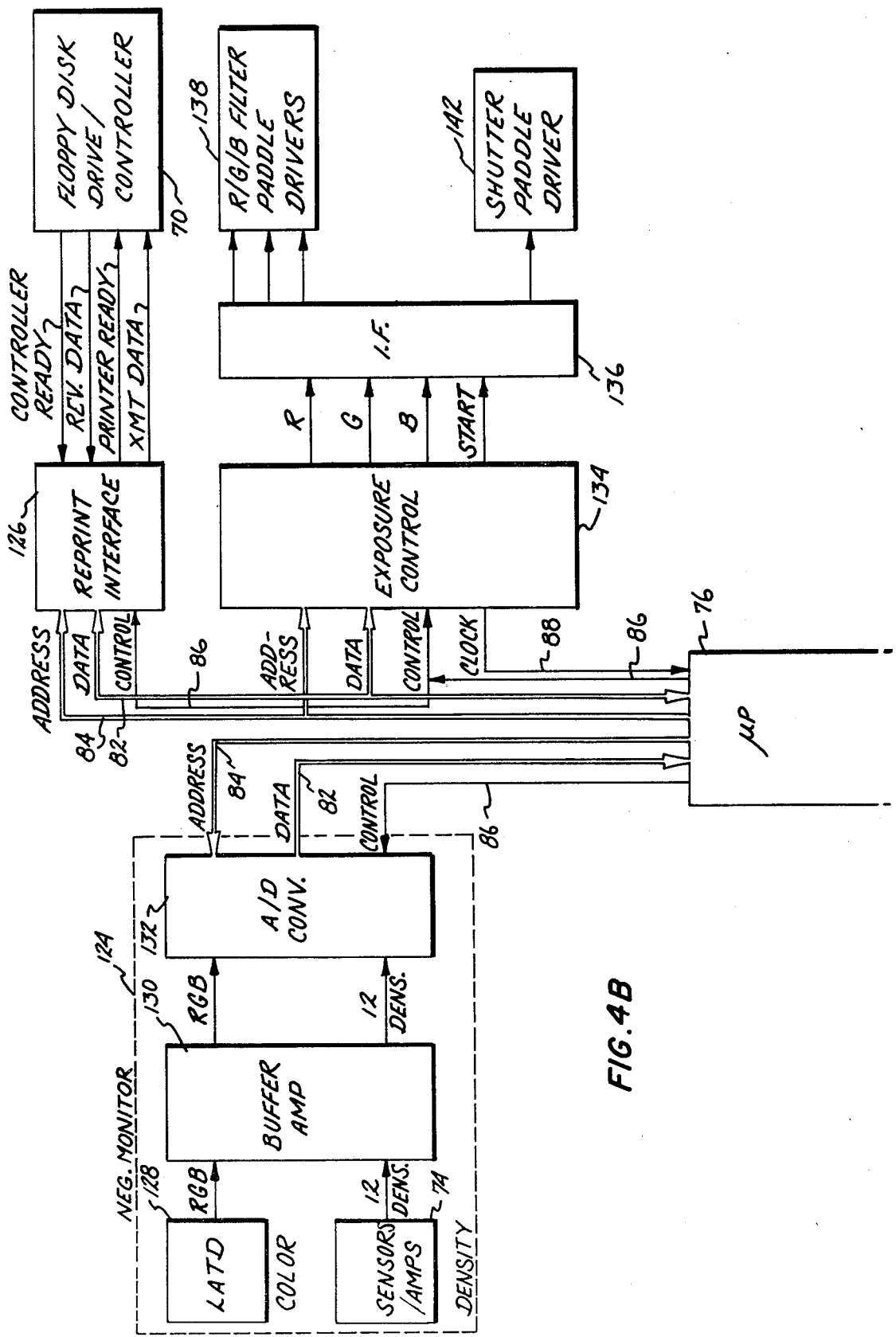

FIGS. 4A and 4B show an electrical block diagram of printer 42 shown in FIG. 2. Coordinating and controlling the operation of printer 42 is microprocessor 76, which in one preferred embodiment is an eight-bit microprocessor such as an Intel 8080A. Associated with microprocessor 76 are electrically programmable read only memory (EPROM) 78 and random access memory (RAM) 80. Microprocessor 76 communicates with the various portions of the control system through data bus 82, address bus 84, control bus 86, clock line 88, and interrupt lines 90.

In the embodiment shown in FIGS. 4A and 4B, microprocessor 76 directly controls the exposure control functions of the printer. In addition, microprocessor 76 coordinates the operation of paper feed control 92, film feed control 94, and cut/end-of-order punches 96 through control interface 98 and interface circuit 100. Input monitor signals are supplied to microprocessor 76, and output control signals are supplied to paper feed control 92, film feed control 94, and cut/end-of-order punches 96.

In the embodiments shown in FIGS. 4A and 4B, hole sensors 102, which sense the punched holes in paper tab 14, supply signals to microprocessor 76 through interface circuit 100, and control interface 98.

Microprocessor 76 receives control information entered by the operator of printer 42 through control panel 104 shown in FIG. 2. Console 104 includes a keyboard 106 through which the operator can enter a wide variety of alpha-numerical control information. Among the control information which is entered through keyboard 106 is red, green, blue and overall density button corrections entered by the operator. In preferred embodiments, color balance setup parameters, slope, gamma factors, and other exposure control parameters are also entered through keyboard matrix 106. As shown in FIG. 4A, function switches 108 are monitored by microprocessor 76 through keyboard matrix 106. Light emitting diodes 110 are associated with function switches 108, and depending upon which function or functions are selected by function switches 108, microprocessor 76 energizes the appropriate light emitting diode or diodes.

Microprocessor 76 communicates with console 104 through control interface 98. Console data lines 112 and control lines 86 interconnect control interface 98 with control console logic 114. Signals to and from keyboard 106 are routed through control console logic 114. In addition to keyboard 106, control console logic 114 also is connected to setup select thumbwheel switches 116, two-digit print quantity display 118, and eight-digit display 120. Thumbwheel switches 116 are used both in the initial storage of color balance setup data in random accessory memory 80, and also during normal first-run production printing to select the setup. As will be discussed in detail later, during reprint operation, the selection of setup is provided by data stored on a floppy disk which is read by floppy disk drive/controller 70.

Alpha-numeric display 122 indicates which color balance setup is being used. Microprocessor 76 provides the control signals to display a message indicating the setup number and name.

Eight-digit display 120 displays the selected button corrections for red, green, blue and overall density. These button corrections have been entered through keyboard 106, or have been supplied from the floppy disk by controller 70, and microprocessor 76 provides the appropriate drive signals to display 120 through control interface 98 and control console logic 114.

In the embodiments shown in FIG. 4A, microprocessor 76 also controls display 122 through control interface 98. Display 122, which is also shown in FIG. 2, displays a wide variety of information of importance to the operator. For example, during initial color balancing display 122 displays instructions of the steps to be performed by the operator. In another mode, display 122 preferably displays current information as to stored parameters, and automatic corrections being used. During normal operation, in either the first-run or reprint mode, display 122 displays setup number and name, or print exposure times, or error messages. Microprocessor 76 controls print exposures based upon stored data contained in EPROM 78, RAM 80, data received from control console logic 114, and sensor signals received from negative monitor circuitry 124 (FIG. 4B). In addition, when the printer is in the reprint mode of operation, additional data is received from floppy disk controller 70 through reprint interface circuit 126.

As shown in FIG. 4B, negative monitor circuitry 124 includes the density sensors 74, which provide measurement of density at a plurality of individual locations on the print. The signals from sensors 74 are produced when the negative is at the preview gate.

Negative monitor circuit 124 also includes large area transmission density (LATD) sensors 128, which provide, red, green and blue LATD signals indicating the overall color content of the negative. LATD sensors 128 are located within the printer below the print gate.

Both the density signals from sensors 74 and the LATD signals from LATD sensors 128 are supplied to buffer amplifier circuit 130.

The LATD signals and the density signals are provided by buffer amplifier circuitry 130 to analog-to-digital converter 132. In a preferred embodiment, analog-to-digital converter 132 also includes multiplexers for multiplexing the twelve density sensor signals and multiplexing the three LATD signals. The signals are converted to digital signals, and are provided to microprocessor 76 over data bus 82.

Based upon the data which it receives, microprocessor 76 supplies data to exposure control 134. In one preferred embodiment, exposure control 134 is similar to the exposure control circuit shown in U.S. Pat. No. 4,140,391 by Laciak and Pone, which is assigned to the same assignee as the present application. Exposure control 134 supplies red, green, and blue exposure time control signals through interface circuit 136 to red, green and blue filter paddle drivers 138. In addition, exposure control 34 supplies a start signal through interface circuit 136 to shutter paddle driver 142.

Figure 5:
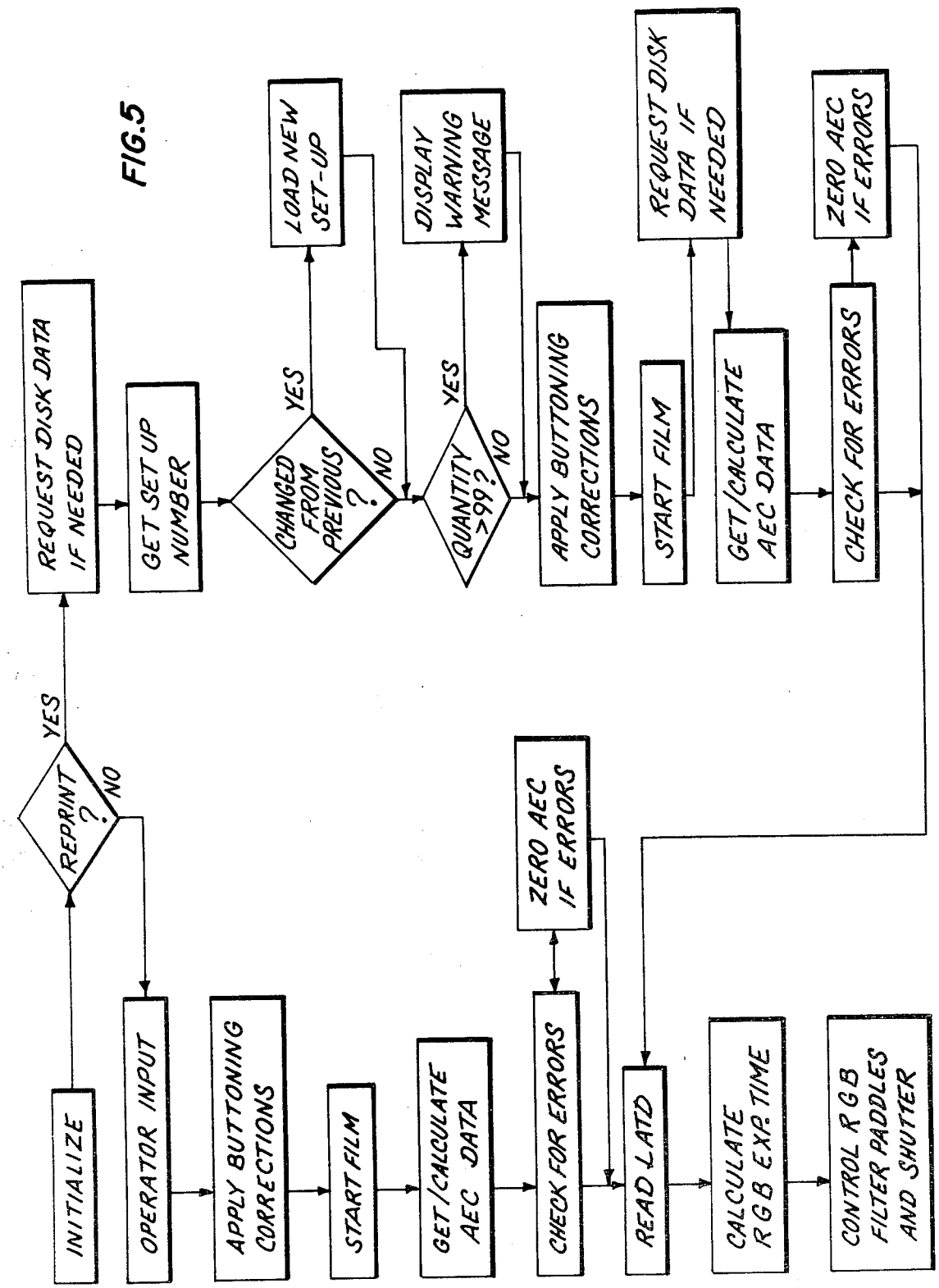
FIG. 5 is a flow diagram of the operations performed by the photographic printer of FIG. 2 when producing reprints.

FIG. 5 is an operational diagram illustrating the operation of the control system of the photographic printer of FIGS. 4A and 4B for both first-run production operation and reprint operation. More detailed operational diagrams may be found in the previously-mentioned patent applications entitled "Photographic Reprint System With Large Print Quantity Verification" and "Photographic Reprint System with Dual Indicia Sensor For Synchronization Recovery". At the beginning of each cycle, the conditions are initialized, so that the system is ready for a print cycle. Microprocessor 76 determines whether printer 42 is in a first-run production or a reprint mode. In a preferred embodiment, circuitry (not shown) associated with the first-run and reprint negholds provides an indication of which mode is being used.

Before discussing the reprint mode, which utilizes the present invention, the first-run production mode will be discussed. In this mode, after determining that the printer is in the first-run production mode, microprocessor 76 interrogates control console logic 114 to determine all operator inputs to be used during the print cycle. In the embodiment shown in FIGS. 4A and 4B, these operator inputs include the setup number which is selected by thumbwheel switches 116. Random access memory 80 contains color balance setup data to be used for each of a plurality of color balance setups.

In one preferred embodiment of the present invention, the color balance setup data stored in random access memory 80 includes the following information: a first film size code; the message to be displayed on alpha-numerical display 122; red, green and blue aim points; gamma factors; slope centers; over/under slope values; color balance factors; density and color button increment; temporary color/density corrections; array calibration data for each film size; over/under reject levels; snow/beach scene (SNRA) value; and totals of average print times, total prints, and number of film synch errors. Some of this setup data is described in further detail in the following patents and patent applications, all of which are assigned to the same assignee as the present application: U.S. Pat. No. 4,149,799 by J. Pone and P. Seidel; 4,168,120 and 4,168,121 by J. Freier, R. Harvey and J. Pone; Ser. No. 848,739 by J. Pone, filed Nov. 4, 1977; Ser. No. 848,738 by J. Pone filed Nov. 4, 1977; Ser. No. 863,733 by R. Laska, filed Dec. 21, 1977; and Ser. No. 867,897 by J. Pone filed Jan. 9, 1978.

It should be understood, of course, that other information may be included within the color balance setup data stored. It should also be understood that in different photographic systems, not all of the information described above is stored as part of the color balance setup data. In most printers, however, the color balance setup data includes at least some of the information listed above, or similar information used in controlling red, green and blue exposures for a particular film type.

Microprocessor 76 then applies any buttoning corrections entered through keyboard matrix 106, which alters the exposures for any and all of the color channels.

The photographic film feed is then started. This causes the frame which has been at the preview gate to be advanced to the print gate. It is this frame which will be printed during the print cycle.

Microprocessor 76 then gets any automatic exposure correction data from array sensors 74, the measurements for which were taken as the frame to be printed passed by the sensor array 74 during this or some previous film movement. It then calculates the appropriate automatic exposure correction data which is used in providing corrections for certain types of printing failures. Microprocessor 76 then checks for film data sequence (i.e., "film synch") errors and sets the automatic exposure correction data to zero if errors are found to exist.

At this point, the negative frame to be printed has advanced to the print gate and has been stopped. Print light is permitted to pass through the negative frame, and red, green and blud LATD signals are obtained from LATD sensors 128. During this LATD measurement, the shutter paddle which is positioned between the negative print gate and the photographic print paper is in position, so that no light impinges upon the print paper.

Microprocessor 76 then calculates red, green and blue exposure times based upon the color balance setup information, the automatic exposure correction data, the buttoning corrections which have been entered by the operator (if printer 42 is in manual, i.e. operator controlled operation), and the LATD signals. Based upon the calculated red, green and blue exposure times, microprocessor 76 controls, through exposure control 134 and interface 136, the red, green and blue filter paddle drivers 138, and shutter paddle driver 142. Calculation and control of exposure times in one preferred embodiment is described in further detail in previously mentioned U.S. Pat. Nos. 4,104,391 and 4,168,120. After the exposures of all three color channels have been completed, as indicated by the shutter paddle being driven into the light path, paper feed control 92 is actuated to complete the entire operational cycle. The cut-/end-of-order punches have been actuated at the beginning of the exposure. Microprocessor 76 returns to its initial state, and waits for the next print cycle to be initiated.

The operation of the printer system in the reprint mode is also shown in FIG. 5. In this mode, circuitry associated with neghold 54 indicates that the printer is in the reprint mode. During the first cycle of operation, microprocessor 76 requests data from floppy disk drive/controller 70 through reprint interface 126. In subsequent cycles, the disk data will already have been requested and will have been received by microprocessor 76 before the print cycle starts.

The disk data provided to microprocessor 76 from floppy disk drive/controller 70 includes the number of holes which should have been sensed for that frame, print quantity, density and color correction data, and setup number for the frame to be printed. In the present invention the disk data also includes a second film size code for error checking purposes. Mircroprocessor 76 first gets the setup number which has been provided by floppy disk drive/controller 70 and determines whether this has changed from the previous cycle. If, of course, the reprint system is in its first cycle, or if the setup number has changed from the previous frame which is printed, microprocessor 76 loads the new setup data which it has retrieved from random access memory 80. This color balance setup data will be used in printing during this cycle. As a result, each negative frame is printed using the color balance setup which will provide best print quality. It further permits various strips of film of different film types but similar size to be attached on a single tab 14, since printer 42 automatically selects the proper setup based upon the data supplied from floppy disk drive/controller 70 for that particular negative frame.

It can be seen, of course, that the setup number can be stored on the floppy disk for each frame, or each strip, or can be stored only for each strip where a change in setup is required. In this latter case, microprocessor 76 assumes that no change in setup is required unless it receives a new setup number from floppy disk drive/controller 70.

In the present invention, microprocessor 76 compares the first film size code from the selected setup with the second film size code received from controller 70. In one embodiment, the first film size code is either "110", "126" or "135" for the three common film sizes. The second film size code is either "1" (for 110 size film), "2" (for 126 size film), or "3" (for 135 size film). Microprocessor 76 compares the second film size code with the middle digit of the first film size code. If the first and second film size codes do not correspond, this indicates an error and microprocessor 76 halts operation of the printer and displays an error message on display 122. The operator then locates the source of the error, takes appropriate corrective action, and re-starts the printer.

As a precaution to avoid large quantities of waste prints, after the setup has been loaded, microprocessor 76 determines whether the desired print quantity exceeds a preset number (which in the embodiment shown is ninety-nine). If it does, microprocessor 76 causes a warning message to be displayed on display 122. After verifying the required quantity and film framing the operator may tell the printer to print that frame, or may modify the quantity or adjust film position, etc. before telling the printer to continue. As long as the quantity of prints requested is less than the preset number, microprocessor 76 continues with the reprint cycle, producing the requested quantity of prints.

The data received from floppy disk drive/controller 70 for the frame to be printed includes density and color correction data, which is typically in the form of desired buttoning corrections. These buttoning corrections are entered and calculated by microprocessor 76 for use in the reprint cycle instead of manually entered data from the control console.

Microprocessor 76 then starts the film advance by providing the proper outputs through control interface 98 and interface circuit 100 to film feed control 94. Signals from hole sensors 102 indicate to the microprocessor 96 when the paper tab 14 and film 12 has advanced so that the next frame is aligned in the print gate. In addition, the signals from the hole sensor 102 at the preview gate permit microprocessor 76 to count the number of holes per frame. In the embodiment described above, a single hole indicates a frame, two holes at a frame signify the end of a strip, three holes at a frame indicate end of order, and four holes at a frame indicate end of reel.

After initiating the film advance, microprocessor 76 requests disk data for the next reprint cycle, if needed. This is based, of course, on the signals which have been received from hole sensors 102.

Microprocessor 76 then gets and calculates the automatic exposure correction data from sensors 74 and calculates the appropriate automatic exposure corrections. These corrections and film position sequence information are checked for errors, and the corrections are set to zero if an error exists.

At this point, the reprint cycle becomes the same as the first run production cycle, with LATD measurements being made; red, green and blue exposure times being calculated; and red, green and blue filter paddles and shutter paddle being controlled by microprocessor 76.

It can be seen, therefore, that with the present invention, the storage of setup numbers permits each frame to be printed with the proper color balance parameters. This significantly improves the average reprint quality over systems which merely select a compromise setup to be used with all film types during reprinting in order to avoid the difficulties of sorting negatives by film type.

In addition, the present invention eliminates the need for extensive sorting which has been necessary in other reprint systems. The present invention, therefore, provides a higher quantity of quality reprints without requiring sorting by film type.

With the error checking of the present invention, errors due to improper selection of setup at the preparation station, due to system malfunction or due to loss of synchronization are identified automatically. This prevents waste of materials and loss of production time due to the use of an improper color balance setup.

Although the present invention has been described with reference to preferred embodiments, workers skilled in the art will recognize that changes may be made in form and detail without departing from the spirit and scope of the invention. For example, although the specific embodiment described uses a first film size code which is stored as part of each color balance setup, other means for providing the first film size code are also possible. In one embodiment, the neghold carries a film size code indicating the film size with which the neghold is used. This film size code may be in place of, or in addition to, the film size code stored in the setup.

What is claimed is:

1. A photographic printing system for printing photographic prints from a plurality of photographic film originals of different film types which are connected together, the printing system comprising:

first storage means for storing a plurality of color balance setups, each color balance setup including a first film size code indicative of the film size with which the color balance setup is used;

second storage means for storing an indication of a selected one of a plurality of color balance setups stored by the first storage means to be used in printing the film original and a second film size code indicative of the size of the film original to be printed;

means for retrieving, prior to printing the film original, the stored indication and the second film size code from the second storage means;

means for comparing the second film size code retrieved from the second storage means with the first film size code associated with the selected color balance setup stored in the first storage means;

means for controlling printing of the film original as a function of the selected color balance setup if the first and second film size codes have a predetermined correspondence.

2. The invention of claim 1 and further comprising:
means for inhibiting printing of the film original if the first and second film size codes do not have a predetermined correspondence.

3. The invention of claim 1 wherein the films are connected to an elongated tab.

4. A method of printing photographic prints from a plurality of photographic films of different film types, the method comprising:

storing a plurality of different color balance setups to be used in printing, each color balance setup including a first film size code indicative of the film size with which the color balance setup is used;

connecting the photographic films;

storing, for each film original to be printed, an indication of a selected color balance setup from among the plurality of stored color balance setups to be used in printing that film original, and a second film size code indicative of the size of the film;

retrieving, prior to printing a film, the stored indication of the selected color balance setup for that film original and the second film size code;

comparing the second film size code with the first film size code associated with the selected color balance setup; and printing the film using the selected color balance if the first and second film size codes have the predetermined correspondence.

5. The method of claim 4 and further comprising:
inhibiting printing if the first and second color size codes do not have a predetermined correspondence.

6. A photographic reprint system in which photographic prints are produced from film frames of film segments which are attached to an elongated tab, the improvement comprising:

first storage means for storing a plurality of color balance setups, each color balance setup including a first film size code;

second storage means for storing information for each film frame to be printed, the information including an indication of a selected color balance setup and a second film size code;

a print gate at which light is directed through a film frame to expose a photosensitive medium;

means for sequentially advancing the film frame and tab to the print gate;

means for sequentially retrieving the information stored in the second storage means; and means for comparing the second film size code retrieved from the second storage means with the first film size code associated with the selected color balance setup and providing a signal if the first and second film size codes do not have a predetermined correspondence.

7. In a photographic printing system for printing photographic prints from photographic film originals, the improvement comprising:

means for providing a first film size code indicative of a film size which the printing system is capable of printing;

storage means for storing control information to be used in printing a film original and a second film size code indicative of the size of the film original; and means for comparing the first and second film size codes and providing an indication if the first and second film size codes do not have a predetermined correspondence.

8. The invention of claim 7 and further comprising:
means for inhibiting printing if the first and second film size codes do not have a predetermined correspondence.

9. The invention of claim 8 and further comprising:
display means for displaying messages to an operator of the photographic printing system; and
wherein the means for comparing causes the display means to display an error message if the first and second film size codes do not have the predetermined correspondence.

10. The invention of claim 7 wherein the means for providing a first film size code stores a plurality of color balance setups, each setup including a first film size code; and wherein the control information includes an indication of one of the color balance setups.

* * * * *